(12) United States Patent
Son

(10) Patent No.: US 7,209,203 B2
(45) Date of Patent: Apr. 24, 2007

(54) THIN FILM TRANSISTOR LIQUID CRYSTAL DISPLAY DEVICE IMPLEMENTING MULTI-DOMAINS FOR LIQUID CRYSTAL

(75) Inventor: Hyeon-Ho Son, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 269 days.

(21) Appl. No.: 09/731,895

(22) Filed: Dec. 8, 2000

(65) Prior Publication Data

US 2001/0024244 A1    Sep. 27, 2001

(30) Foreign Application Priority Data

Dec. 9, 1999    (KR) ............................... 1999-56162

(51) Int. Cl.
*G02F 1/1343*    (2006.01)
*G02F 1/1337*    (2006.01)

(52) U.S. Cl. ....................... 349/139; 349/129

(58) Field of Classification Search .................. 349/42, 349/43, 139, 143, 144, 129
See application file for complete search history.

(56) References Cited

U.S. PATENT DOCUMENTS

| | | | |
|---|---|---|---|
| 5,940,151 A * | 8/1999 | Ha | 349/43 |
| 6,275,275 B1 * | 8/2001 | Ha | 349/42 |
| 6,337,723 B1 * | 1/2002 | Bae | 349/43 |
| 6,441,873 B2 * | 8/2002 | Young | 349/43 |
| 6,724,452 B1 * | 4/2004 | Takeda et al. | 349/139 |
| 6,952,249 B2 * | 10/2005 | Matsuoka et al. | 349/129 |

FOREIGN PATENT DOCUMENTS

| | | |
|---|---|---|
| JP | 11-119223 A | 4/1999 |
| KR | 1996-0015004 | 5/1996 |
| KR | 1999-0085360 | 12/1999 |

OTHER PUBLICATIONS

N. Koma, Y. Baba, K. Matsuoka, No-Rub Multi-Domain TFT-LCD Using Surrounding Electrode Method, SID Digest, 1995, pp. 869-872.

Y. Tanaka et al., Late News Paper: A New Design to Improve Performance and Simplify the Manufacturing Process of High Quality MVA TFT-LCD Panels, Sid Digest 99, pp. 206-207.

* cited by examiner

*Primary Examiner*—Dung T. Nguyen
(74) *Attorney, Agent, or Firm*—McKenna Long & Aldridge LLP

(57) ABSTRACT

The present invention discloses a multi-domain liquid crystal panel having a wide viewing angle. In the liquid crystal panel including upper and lower substrates and a liquid crystal interposed therebetween, first and second domains are divided via a slit and a pair of side edges, wherein the side edges are bent so that the central region of the pixel electrode is a first distance from a common electrode and the side edges are a second distance from the common electrode. Under an electric field, portions of a liquid crystal in the first and second domains show different orientational alignments.

39 Claims, 7 Drawing Sheets

THIN FILM TRANSISTOR LIQUID CRYSTAL DISPLAY DEVICE IMPLEMENTING MULTI-DOMAINS FOR LIQUID CRYSTAL

This application claims the benefit of Korean Patent Application No. 1999-56162, filed on Dec. 9, 1999, which is hereby incorporated by reference.

BACKGROUND OF THE INVENTION

1. Field of the Invention

The present invention relates to a liquid crystal display device, and more particularly to a thin film transistor liquid crystal display (TFT-LCD) device implementing multi-domains for a liquid crystal.

2. Discussion of the Related Art

Recently, liquid crystal display (LCD) devices with light, thin, low consumption characteristics are used in office automation equipment, video units and the like. Among various type devices, thin film transistor liquid crystal display (TFT-LCD) devices are widely used because of their superior color-displaying quality and advantage of thickness.

As display areas of liquid crystal display devices are made larger and larger, the quality of the viewing angle of the LCD devices becomes the more important property among various quality factors of the liquid crystal display device. To improve the quality of the viewing angle, additional retardation films or diffusion layers have been used in liquid crystal panels of the liquid crystal display devices. And further, instead of these expensive improved methods, a method of aligning the liquid crystal in different orientations was developed.

That is to say, a plurality of different electric fields parallel with a substrate are adapted to align the liquid crystal molecules in various domains. To achieve the differently directed electric fields parallel with the substrate, common and pixel electrodes are formed to have different areas.

In detail, a first portion of the liquid crystal in a first electric field is aligned in a first orientation, while a second portion of the liquid crystal in a second electric field is aligned in a second orientation such that first and second domains of the liquid crystal are defined. Since molecules in the first domain have a different orientation from that of molecules in the second domain, the viewing angle of the liquid crystal is widened.

FIG. 1 shows the configuration of a typical TFT-LCD device. The TFT-LCD device 1 includes upper and lower substrates 10 and 20 with a liquid crystal 50 interposed therebetween. The upper and lower substrates 10 and 20 are called a color filter substrate and an array substrate, respectively.

In the upper substrate 10, on a surface opposing the lower substrate 20, black matrix 12 and color filter layer 14 that includes a plurality of red (R), green (G), and blue (B) color filters are formed in an array matrix such that each color filter is surrounded by the black matrix 12. Further on the upper substrate 10, a common electrode 16 is formed and covers the color filter layer 14 and the black matrix 12.

In the lower substrate 20, on a surface opposing the upper substrate 10, a TFT "T", as a switching device, is formed in an array matrix corresponding to the color filter layer 14, and a plurality of crossing gate and data lines 26 and 28 are positioned such that each TFT is located near each intersection of the gate and data lines 26 and 28. Further, in the lower substrate 20, a plurality of pixel electrodes 22 are formed on an area defined by the gate and data lines 26 and 28, a pixel portion "P". The pixel electrode 22 is a transparent conductive metal such as indium tin oxide (ITO).

To align the liquid crystal 50 in different orientations for improving the viewing angle, the structure around the pixel portion P is conventionally formed, as shown in FIGS. 2 and 3. On the pixel portion P, a side electrode 30 surrounds the pixel electrode 22 in a position slightly below the pixel electrode 22, as shown in FIG. 3. The side electrode 30 is electrically connected with the common electrode 16 formed on the upper substrate 10 of FIG. 1.

As shown in FIG. 3, the pixel electrode 22 is spaced apart from the common electrode 16. A gap or slit 18 forms a through hole in the common electrode. The slit 18 is formed in a position corresponding to a longitudinal center of the pixel electrode 22, as indicated by longitudinal center line 32. Because the side electrode 30 is lower than the pixel electrode 22 and electrically connected with the common electrode 16, when there is a voltage difference between the pixel and common electrodes 22 and 16, different electric fields 34a and 34b are induced, respectively, in the liquid crystal 50 in first and second domains "A" and "B". First and second domains "A" and "B" are separated by a boundary domain "C", and centered on the slit 18. The first and second electric fields 34a and 34b in the first and second domains A and B are tilted outward to the side electrode 30, and little or no electric field exists in the boundary domain "C".

Since the liquid crystal 50 is aligned in different orientations in the multi-domains including the first and second domains A and B, the viewing angle quality of the LCD device is improved.

FIGS. 4 and 5 show another conventional liquid crystal display device similar to FIGS. 2 and 3. In the structure shown in FIGS. 4 and 5, an organic rib 19 substitutes for the slit 18 of FIGS. 2 and 3. The first and second domains A and B and a boundary domain C are defined by the rib 19. Similarly to FIG. 3, the first and second electric fields 34a and 34b define the multi-domains, i.e., the first and second domains A and B.

However, in the above-mentioned conventional liquid crystal display devices implementing the multi-domain liquid crystal, the side electrode is opaque and decreases the area of the pixel electrode. Thus, the aperture ratio is much lower than that of a mono-domain liquid crystal display device. The actual aperture ratio of the above-mentioned liquid crystal display devices are about 45%, while that of the typical mono-domain liquid crystal display device implementing the mono-domain with twisted neumatic liquid crystal (TN-LC) is about 65%. The decrease in aperture ratio results in decrease in brightness by about 30%.

Further, an additional fabrication step of photolithography is added to form the slit or rib on the common electrode, so that fabricating processes become much complicated.

SUMMARY OF THE INVENTION

Accordingly, the present invention is directed to a TFT-LCD device that substantially obviates one or more of the problems due to limitations and disadvantages of the related art.

An object of the present invention is to provide a TFT-LCD device having a wide viewing angle and a relatively high aperture ratio, and to be fabricated via simple fabricating processes.

In order to achieve the above object, in one aspect, the preferred embodiment of the present invention provides a liquid crystal display device including gate and data lines on a first substrate; a switching device at a cross point of the gate and data lines; a pixel electrode on the first substrate, the pixel electrode having a slit and side edge portions that are bent; a common electrode on a second substrate; and a liquid crystal layer between the first and second substrates.

In one aspect of the device, the side edge portions are convex portions, and the slit corresponds to the data line. The device further includes a center electrode below the slit. The center electrode is formed in the same layer as the gate line or in the data line. The center electrode is electrically connected with the common electrode. Another aspect of the device further includes a rib on the second substrate, and the rib corresponds to the side edge portions that are concave portions. The device further includes a center electrode below the slit. The center electrode is formed in the same layer as the gate line or as the data line.

In yet another aspect of the device a rib is included between the slit and the side edge portions.

The liquid crystal layer has a twist angle of 10 to 80 degrees.

In order to achieve the above object, another aspect of the present invention provides a liquid crystal display panel including first and second substrates spaced apart from each other; liquid crystal interposed between the first and second substrates; a common electrode positioned on the first substrate and opposing the second substrate; gate and data lines perpendicular to each other and positioned on the second substrate; a TFT positioned at an intersection of the gate and data lines; and a pixel electrode positioned on the second substrate, opposing the common electrode, and including a slit and side edge portions, the side edge portions being bent toward the first substrate.

The liquid crystal display panel further includes a center electrode below a slit in the pixel electrode on the second substrate, the center electrode being electrically connected with the common electrode of the first substrate.

In another aspect, the present invention provides the above-mentioned liquid crystal display panel where the pixel electrode is aligned over the data line such that the slit of the pixel electrode corresponds to the data line.

In another aspect, the liquid crystal display panel further includes an insulating rib over each of the side edges of the second substrate.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, which are illustrated in the accompanying drawings.

First Preferred Embodiment

Figure 6:
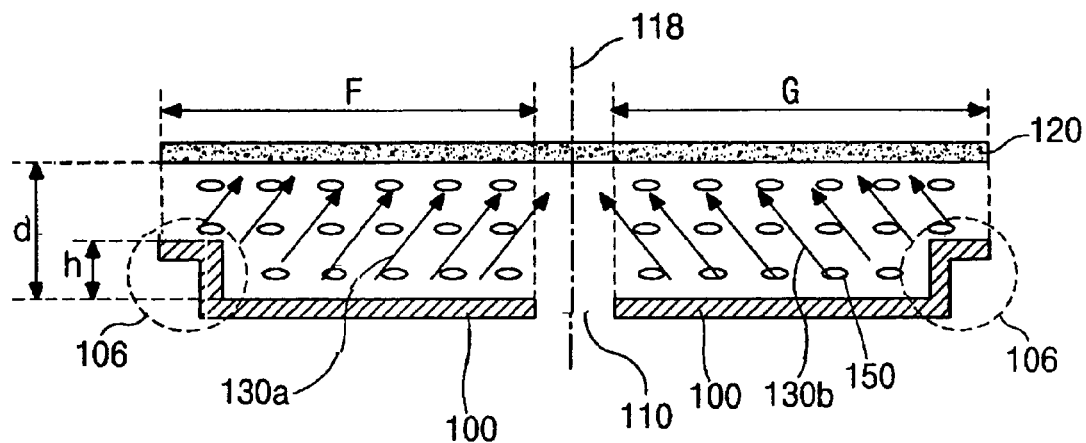
FIGS. 6 to 10 are cross sectional views illustrating a portion of a liquid crystal panel according to first to fifth preferred embodiments of the present invention, respectively.

FIG. 6 illustrates a liquid crystal display panel according to the first preferred embodiment of the present invention. A pixel electrode 100 includes a gap or slit 110 that is formed along a centerline 118 of the pixel electrode 100. In this embodiment, both sides of the pixel electrode 100 are bent to form convex side edges 106, which have an upward height "h" from an upper surface of the pixel electrode 100. Thus, first or end portions of the pixel electrode 100 are closer to the common electrode 120 than second or center portions pixel electrode 100. As shown in FIG. 6, each side of the pixel electrode 100 preferably has two bends. A common electrode 120 is spaced apart from the pixel electrode 100 by a cell gap "d". Liquid crystal 150 is interposed between the common and pixel electrodes 120 and 100.

Figure 1:
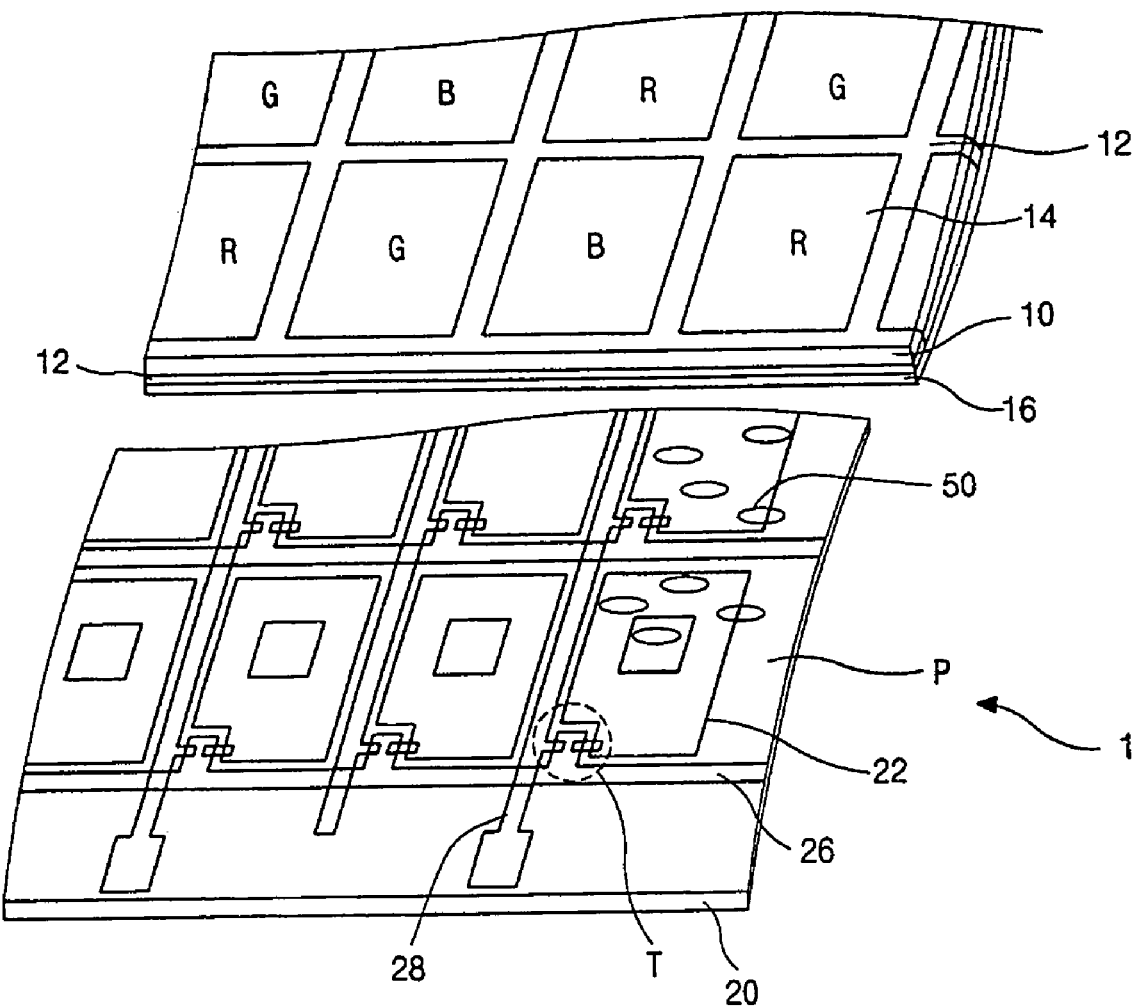
FIG. 1 illustrates a configuration of a typical liquid crystal display panel.
Figure 2:
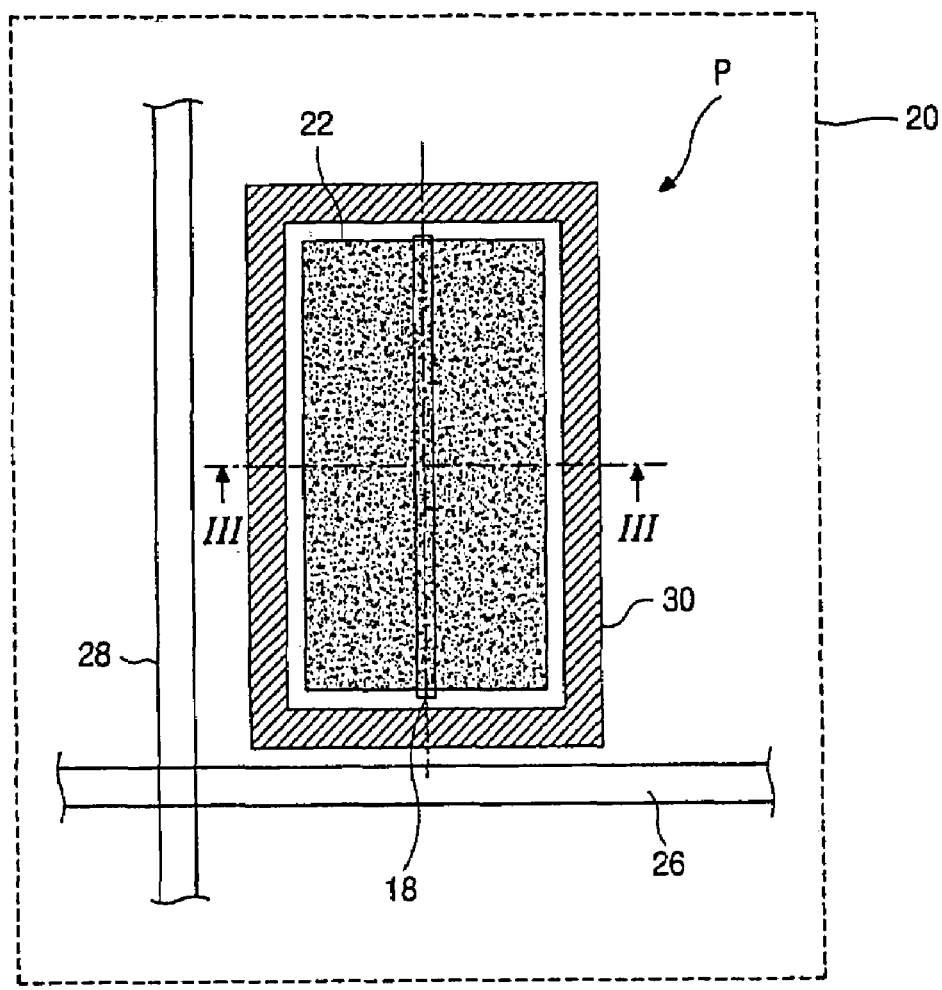
FIG. 2 is a conceptual enlarged view of a pixel portion in a conventional multi-domain TFT-LCD panel.
Figure 3:
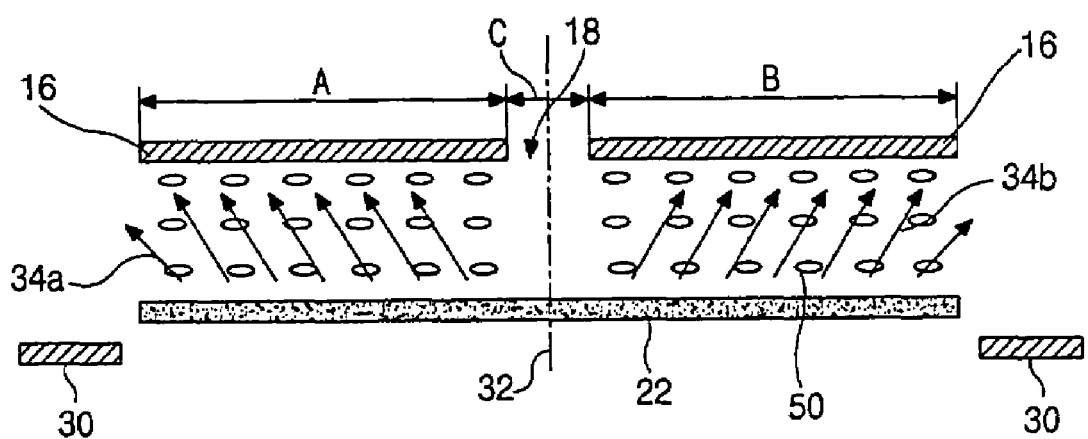
FIG. 3 is a cross sectional view taken along a line "III—III" of FIG. 2.
Figure 4:
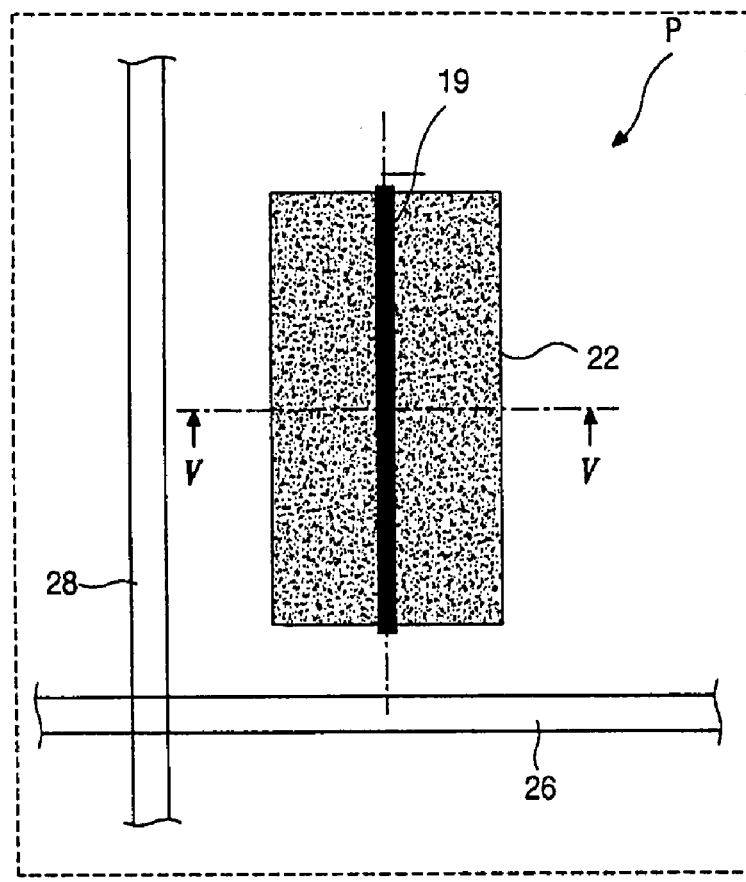
FIG. 4 is a conceptual enlarged view of a pixel portion in another conventional multi-domain TFT-LCD panel.
Figure 5:
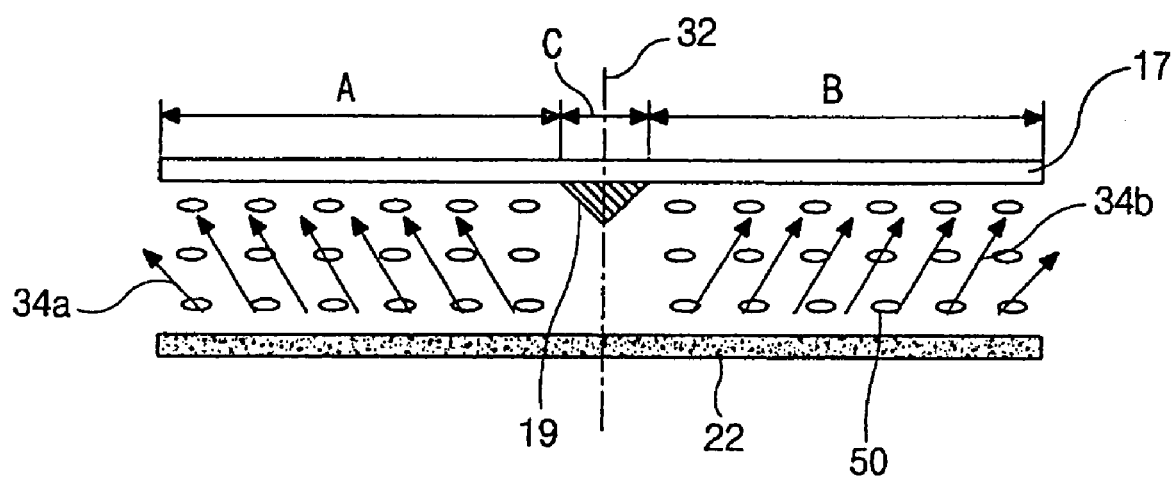
FIG. 5 is a cross sectional view taken along a line "V—V" of FIG. 4.

Like the typical liquid crystal display device of FIG. 1, each pixel portion ("P" of FIG. 1), where the pixel electrode 100 is positioned, is surrounded by two adjacent pairs of the gate and data lines (respectively, 26 and 28 shown in FIG. 1). A TFT ("T" shown in FIG. 1) is positioned near a cross point of the data and gate lines. Further, the common electrode 120 is positioned on an upper substrate (10 of FIG. 1), while the pixel electrode 100 is positioned on a lower substrate (20 of FIG. 1) of the liquid crystal panel.

When a voltage difference is generated between the pixel electrode 100 and the common electrode 120, first and second electric fields 130a and 130b are induced. Because of the convex side edges 106 and the slit 110 of the pixel electrode 100, the first and second electric fields 130a and 130b are uniformly tilted toward the centerline 118 such that the first and second electric fields define first and second domains "F" and "G", respectively, without the need for a side electrode. A first portion of the liquid crystal 150 in the first domain F is differently aligned from a second portion of the liquid crystal 150 in the second domain G.

At this point, the height "h" of the convex side edges 106 should be preferably greater than one tenth of the cell gap "d" such that any effect from the data lines (28 shown in FIG. 1) that are adjacent the pixel electrode 100 can be excluded. The height "h" is preferably in the range of 1 to 8 micrometers, inclusive. Thus, the first and second electric fields are induced in the liquid crystal 150 immediately adjacent the center line 118 and shadowed portions along the edge of the pixel area are reduced. Otherwise, the first and second electric fields 130a and 130b near the convex side edges 106 are more tilted outward to the data lines rather than tilted to the centerline 118. In that case, the first and second electric fields can not be tilted uniformly throughout the first and second domains, respectively. Further, the convex side edges 106 exclude abnormal electric fields, which are usually formed at edges of a conventional plane pixel electrode without the convex side edges.

Since there is no loss in the size of the pixel electrode and shadowed portions are reduced, the aperture ratio of the above-mentioned liquid crystal display device is greater than that of the conventional multi-domain liquid crystal display device implementing side electrodes 30 shown in FIGS. 2 to 5. Further, since the convex side edges are formed at the same time with the pixel electrode, the fabricating process is simpler than in the case of a conventional multi-domain liquid crystal display having side electrodes.

Second Preferred Embodiment

Figure 7:
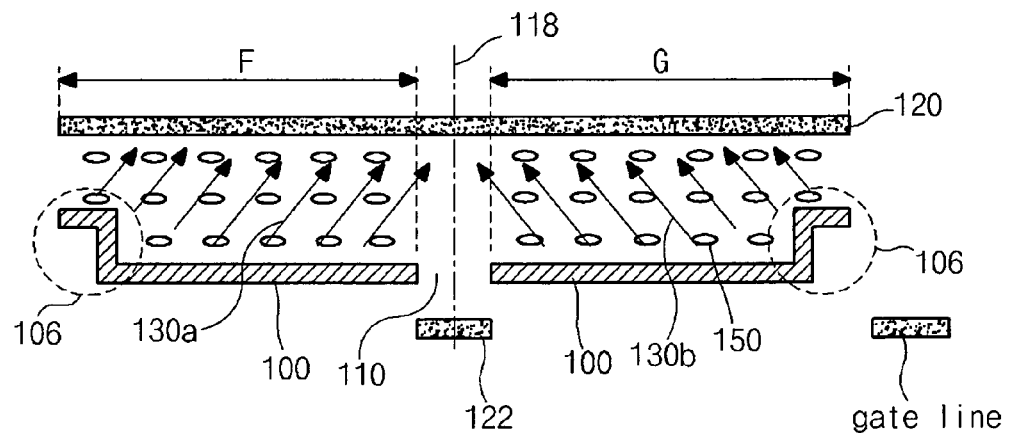

In FIG. 7, a center electrode 122 is positioned below the slit 110 of the pixel electrode 100. The center electrode 122 is electrically connected with the common electrode 120 such that the voltage difference between the pixel electrode 100 and the common electrode 120 is the same as the voltage difference between the pixel electrode 100 and the center electrode 122. Due to the center electrode 122, the first and second electric fields 130a and 130b are more tilted to the center line 118. Namely, the center electrode 122 enhances the effect of the slit 110 that defines the first and second domain F and G.

Figure 11A:
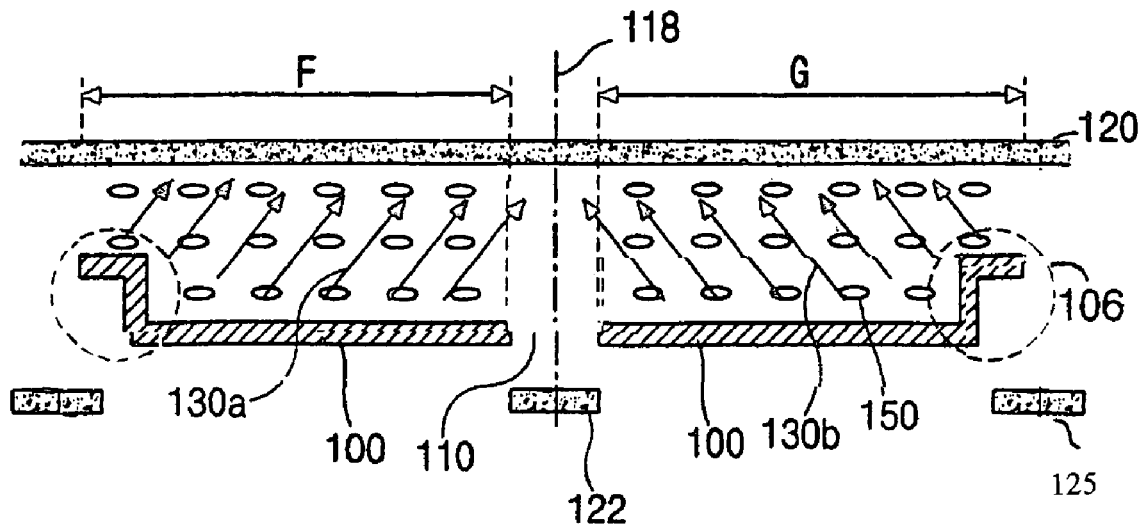
FIGS. 11A and 11B illustrate exemplary cross-sectional views of embodiments of the present invention in which the center electrode is formed in the same layer as the gate lines and date lines, respectively.
Figure 11B:
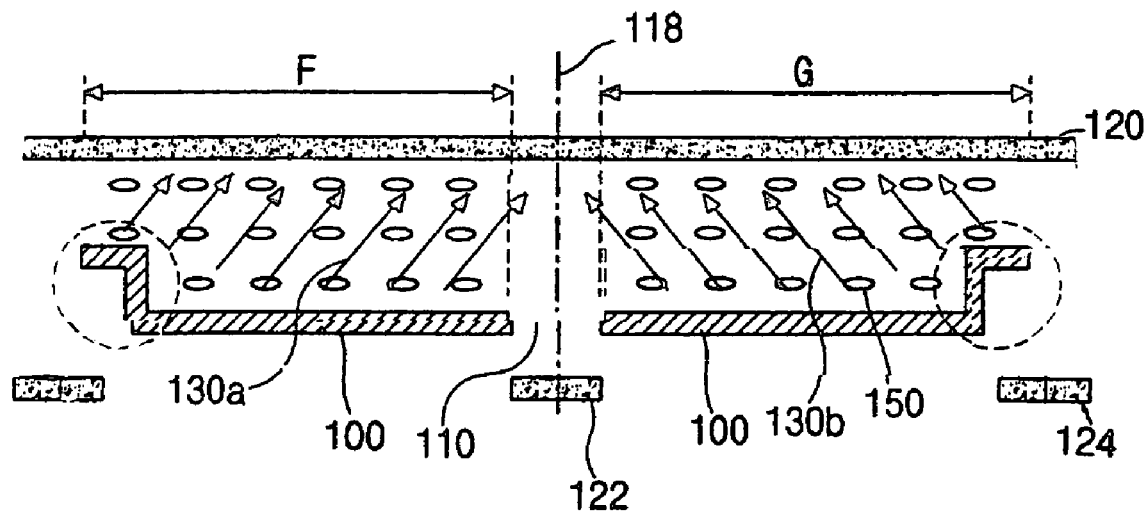

The center electrode 122 is preferably formed in the same layer as gate lines 125 or data lines 124, as shown by example in FIGS. 11A and 11B. respectively. In another aspect, the center electrode 122 is preferably formed using the data line itself as the center electrode, as in the third preferred embodiment described below.

Third Preferred Embodiment

In the third preferred embodiment, a data line 124 substitutes for the center electrode 122 of the second preferred embodiment. The pixel electrode 100 is aligned such that the gap or slit 110 of the pixel electrode 100 is positioned over the data line 124. The data line 124 has the similar structure as the data line 28 shown in FIG. 1.

While a gate line (26 of FIG. 1) corresponding to the pixel electrode 100 receives gate signals from a gate driving circuit (not shown), the data line 124 transmits data signals to the pixel electrode 100 such that there is no voltage difference generated between the pixel electrode 100 and the data line 124. However, the gate signal period is much shorter than the non-gate signal period, and during non-gate signal period, there occurs little voltage difference between the data line 124 and the common electrode 120. Accordingly, when a voltage difference is generated between the common electrode 120 and the pixel electrode 100, nearly the same voltage difference occurs between the data line 124 and the pixel electrode 100. Accordingly, the data line 124 provides the same effect on the first and second electric fields 130a and 130b as the center electrode 122 provides.

Therefore, like the second preferred embodiment, the third embodiment also provides the multi-domains, the first and second domains "F" and "G", with a relatively higher aperture ratio than the conventional multi-domain liquid crystal display device shown in FIGS. 2 to 5. The aperture ratio of the third preferred embodiment increases to about 55%, and the brightness thereof increases by more than 20% over conventional LCDs.

Fourth Preferred Embodiment

Figure 8:
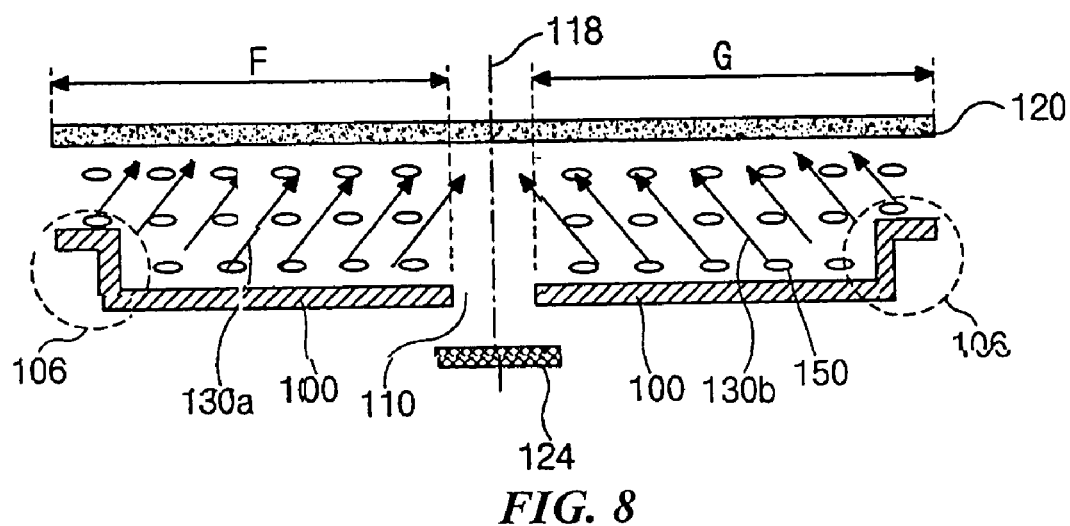
Figure 9:
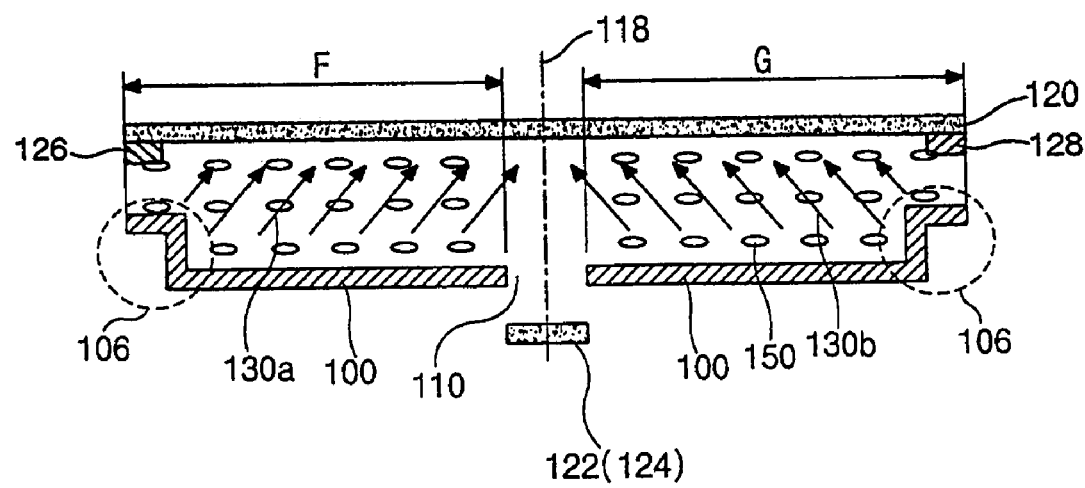

In FIG. 9, first and second insulating ribs 126 and 128 are positioned on the common electrode 120 such that the first and second insulating ribs 126 and 128 oppose the convex side edges 106 of the pixel electrode 100. Below the gap or slit 110 of the pixel electrode 100, the center electrode 122 is positioned as in the second embodiment shown in FIG. 7. Like the third embodiment, the data line 124 of FIG. 8 preferably substitutes for the center electrode 122.

As explained previously, in case of forming the center electrode 122 additionally in the same layer of the gate or data lines (shown in FIG. 1), the convex side edges 106 exclude abnormal electric fields induced by data lines (not shown) adjacent to the pixel electrode 100. However, in case of using the data line 124 in place of the center electrode 122, since the convex side edges 106 also have end portions, the abnormal electric fields, although the effect is small, still occur at the end portions of the convex side edges 106. To exclude the extra-abnormal electric fields, the first and second insulating ribs 126 and 128 are added. The first and second insulating ribs 126 and 128 prevent the extra-abnormal electric fields from being generated between the common electrode 120 and the end portions of the convex side edges 106 so that an outer boundary of the first and second domain "F" and "G" is stably defined.

Fifth Preferred Embodiment

In the fifth preferred embodiment, more domains are defined.

Figure 10:
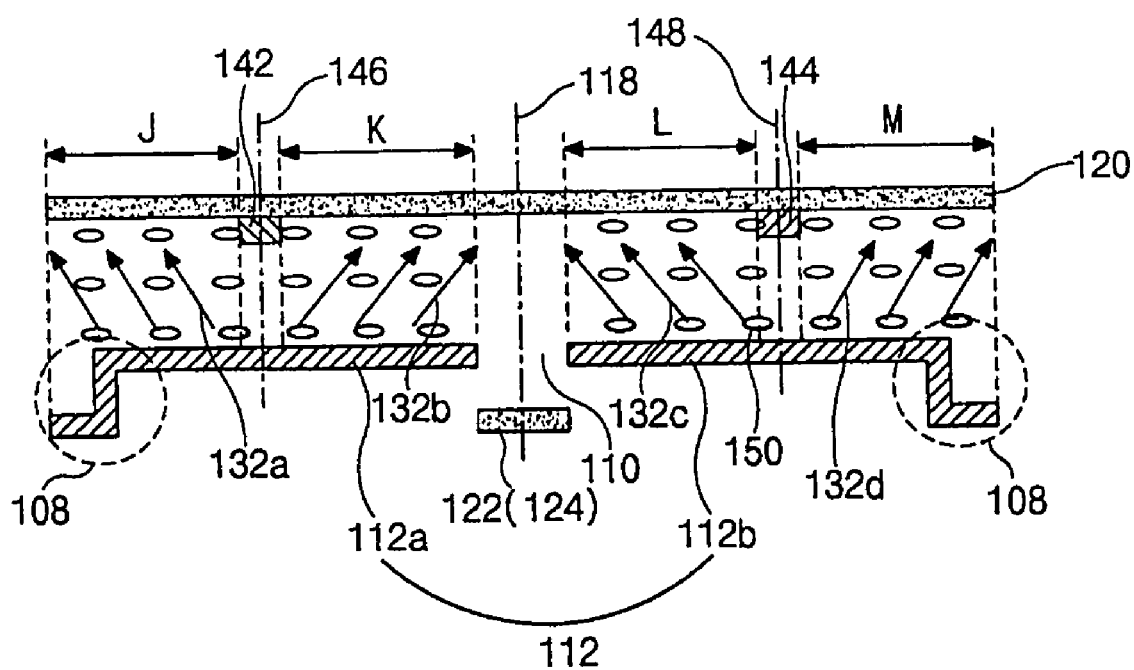

As shown in FIG. 10, at both sides of a pixel electrode 112, concave side edges 108 are positioned downward from the outer surface of the pixel electrode 112. The depth of the convex side edge is preferably larger than one tenth of the cell gap between the first and second substrates (cell gap not shown). On the common electrode 120, first and second insulating ribs 142 and 144 are positioned and oppose the pixel electrode 112. The first and second insulating ribs 142 and 144 are aligned, respectively, to be corresponding to first and second half portion centerlines 146 and 148 of first and second half portions 112a and 112b of a pixel electrode 112. The center electrode 122 is positioned as in the second embodiment shown in FIG. 7. Like the third embodiment, the data line 124 of FIG. 8 preferably substitutes for the center electrode 122.

First, second, third and fourth domains "J", "K", "L", and "M" are defined by the two concave side edges 108, the first and second insulating ribs 142 and 144, and the gap or slit 110 and the center electrode 122 (the data line 124). A first electric field 132a in the first domain between the concave side edge 108 and the first insulating rib 142 is tilted outward from the first half portion center line 142, while a second electric field 132b in the second domain between the first insulating rib 142 and the slit 124 is tilted inward to the center line 118 of the pixel electrode 112. Further, a third electric field 132c in the third domain between the slit 110 and the second insulating rib 144 is tilted inward to the center line 118, while a fourth electric field 132d in the fourth domain between the second insulating rib 144 and the concave side edge 108 is tilted outward from the second half portion center line 148.

Because of the concave edges 108, data lines (not shown) adjacent to the pixel electrode 112 make the first and fourth electric fields 132a and 132d tilt outward. The first insulating rib 142 defines a domain boundary between the first and second domains "J" and "K", while the second insulating rib 144 defines another domain boundary between the third and fourth domains "L" and "M".

The first to the fifth preferred embodiments of the present invention provide the multi-domain liquid crystal display devices having a wide viewing angle.

In each preferred embodiment, though not shown in figures, first and second orientation films are preferably formed on the common and pixel electrodes, respectively. The orientation film is alternately rubbed via a fabric or light or other means for inducing an orientation, or at least one of the orientation films may have no alignment treatment. The slit and the rib preferably have the shape of a straight line for the two domain configuration, and the shape of a "+", "X", "Y" or modifications thereof for greater than two domains.

Further, the liquid crystal interposed and aligned in the multi-domains is preferably vertical alignment (VA) liquid crystal. A low twisted nematic (LTN) liquid crystal (LC) having a twist angle of 10 to 80 degrees is also preferably employed for the liquid crystal display device according to the preferred embodiments. When employing the LTN-LC, the width of the slit should be smaller than that of the center electrode (the data line) to prevent light leakage through the slit. A chiral dopant is preferably mixed with the liquid crystal.

Also, the liquid crystal includes a positive dielectric anisotropy or a negative dielectric anisotropy.

And, a phase difference film can be formed on at least one of the first and second substrates to improve the viewing angle. The phase difference film preferably includes a negative uniaxial film or a negative biaxial film.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   gate and data lines on a first substrate, crossing of the gate lines and data lines defining pixel regions;
   a switching device near the crossing of the gate and data lines;
   a pixel electrode in one of the pixel regions on the first substrate, the pixel electrode having a slit therethrough, a central portion and side edge portions surrounding the central portion, wherein the side edge portions are bent and the central portion is flat;
   a common electrode on a second substrate, wherein an electrical field formed between the side edge portions and the common electrode has a lateral component for multiple domains within the pixel region during an operation; and
   a liquid crystal layer between the first and second substrates.

2. The device of claim 1, wherein the side edge portions have a convex shape.

3. The device of claim 1, wherein the slit corresponds to the data line.

4. The device of claim 1, further comprising a center electrode below the slit.

5. The device of claim 4, wherein the center electrode is formed in the same layer as the data line.

6. The device of claim 4, wherein the center electrode is electrically connected with the common electrode.

7. The device of claim 1, further comprising a rib on the second substrate.

8. The device of claim 7, wherein the rib is located relative to the side edge portions.

9. The device of claim 1, wherein the side edge portions have concave shape.

10. The device of claim 9, further comprising a rib between the slit and the side edge portions.

11. The device of claim 9, further comprising a center electrode below the slit.

12. The device of claim 11, wherein the center electrode is formed in the same layer as the gate line.

13. The device of claim 11, wherein the center electrode is formed in the same layer as the data line.

14. The device of claim 1, wherein the liquid crystal layer has a twist angle of 10 to 80 degrees.

15. A liquid crystal display device comprising:
    gate and data lines on a first substrate;
    a switching device at an intersection of the gate and data lines;
    a pixel electrode on the first substrate, the pixel electrode having a slit, a central portion and side edge portions, wherein the side edge portions are bent to have a convex shape;
    a center electrode below the slit;
    a common electrode on a second substrate; and
    a liquid crystal layer between the first and second substrates, wherein the center electrode is formed in the same layer as the gate line.

16. A liquid crystal display device comprising:
    gate and data lines on a first substrate, crossing of the gate and data lines defining pixel regions;
    a switching device near the crossing of the gate and data lines;
    a pixel electrode in one of the pixel regions on the first substrate, the pixel electrode having a slit therethrough, a central portion and side edge portions surrounding the central portion, wherein the side edge portions have convex portions and the central portion is flat;
    a common electrode on a second substrate, wherein an electrical field formed between the side edge portions and the common electrode has a lateral component for multiple domains within the pixel region during an operation;
    a rib on the second substrate; and
    a liquid crystal layer between the first and second substrates.

17. The device of claim 16, further comprising a center electrode below the slit.

18. The device of claim 16, wherein the rib corresponds to the side edge portions.

19. A liquid crystal display device comprising:
    gate and data lines on a first substrate;
    a switching device at an intersection of the gate and data lines;
    a pixel electrode on the first substrate, the pixel electrode having a slit therethrough, a central portion and side edge portions surrounding the central portion, wherein the side edge portions are bent and the central portion is flat;
    a common electrode on a second substrate;
    a rib on the second substrate;
    and a liquid crystal layer between the first and second substrates.

20. The device of claim 19, further comprising a center electrode below the slit.

21. The device of claim 19, wherein the rib is between slit and the side edge portions.

22. A liquid crystal display panel, comprising:
    first and second substrates spaced apart from each other;
    liquid crystal between the first and second substrates;
    a common electrode positioned on the first substrate and opposing the second substrate;
    gate and data lines perpendicular to each other and positioned on the second substrate, crossing of the gate and data lines defining pixel regions;

a thin film transistor (TFT) positioned near the crossing of the gate and data lines; and a pixel electrode positioned on the second substrate in one of the pixel regions, opposing the common electrode, and including a slit therethrough, a central portion and side edge portions surrounding the central portion, wherein the side edge portions are bent toward the first substrate and the central portion is flat, wherein an electrical field formed between the side edge portions and the common electrode has a lateral component for multiple domains within the pixel region during an operation.

23. The liquid crystal display panel according to claim 22, further including a center electrode, the center electrode located below the slit of the pixel and electrically connected to the common electrode.

24. The liquid crystal display panel according to claim 22, wherein the pixel electrode is located with respect to the data line such that the location of the slit corresponds with the location of the data line.

25. The liquid crystal display panel according to claim 22, wherein said pixel electrode includes a first pixel electrode portion and a second pixel electrode portion, wherein said first pixel electrode portion and said second pixel electrode portion are bordered by the slit, the liquid crystal display panel further including at least two insulated ribs located over each of the first pixel electrode portion and second pixel electrode portion, respectively.

26. The liquid crystal display panel according to claim 22, further including insulating ribs between the side edges and the slit of the pixel electrode.

27. A liquid crystal display panel, comprising:
first and second substrates spaced apart from each other;
liquid crystal interposed between the first and second substrates;
a common electrode positioned on the first substrate and opposing the second substrate;
gate and data lines perpendicular to each other and positioned on the second substrate;
a thin film transistor (TFT) positioned at an intersection of the gate and data lines;
and a pixel electrode positioned on the second substrate, opposing the common electrode, and including a slit therethrough, a central portion and side edge portions surrounding the central portion, wherein the side edge portions are bent and the central portion is flat.

28. The liquid crystal display panel according to claim 27, further including a center electrode, the center electrode located below the slit of the pixel and electrically connected to the common electrode.

29. The liquid crystal display panel according to claim 27, wherein the pixel electrode is located with respect to the data line such that the location of the slit corresponds with the location of the data line.

30. The liquid crystal display panel according to claim 27, wherein said pixel electrode includes a first pixel electrode portion and a second pixel electrode portion, wherein said first pixel electrode portion and said second pixel electrode portion are bordered by the slit, the liquid crystal display panel further including at least two insulated ribs located over each of the first pixel electrode portion and second pixel electrode portion, respectively.

31. The liquid crystal display panel according to claim 27, further including insulating ribs between the side edges and the slit of the pixel electrode.

32. A liquid crystal display panel, comprising:
a first substrate having an inner surface and a second substrate having an inner surface, the inner surface of the first substrate and the inner surface of the second substrate facing one another and having a space therebetween;
liquid crystal interposed in the space;
gate lines and data lines on the inner surface of the second substrate, crossing of the gate lines and data lines defining pixel regions;
a common electrode located on the inner surface of the first substrate;
a pixel electrode located on the inner surface of the second substrate in one of the pixel regions, the pixel electrode having a slit therethrough and further having a first portion a first distance from the common electrode and a second portion a second distance from the common electrode, wherein the first portion in a center of the pixel electrode is flat and the first and second distances are different from each other.

33. The liquid crystal display device according to claim 32, the pixel electrode further includes a central region and side edges, wherein the first distance is defined by the distance of the central region from the common electrode and the second distance is defined by the distance of the side edges from the common electrode.

34. The liquid crystal display device according to claim 33, wherein the first distance is greater than the second distance.

35. The liquid crystal display device according to claim 33, wherein the second distance is greater than the first distance.

36. The liquid crystal display device of claim 32, further including a center electrode electrically connected to the common electrode and located between the pixel electrode and the inner surface of the second substrate in a position corresponding to the slit.

37. The liquid crystal display device of claim 32, wherein the data line is located with respect to the pixel electrode such that the location of the slit corresponds to the location of the data line.

38. The liquid crystal display panel according to claim 32, wherein said pixel electrode includes first and second pixel electrode regions defined by the slit and side edges, the liquid crystal display panel further including at least two insulated ribs located over each of the first and second pixel electrode regions, respectively.

39. A liquid crystal display device comprising:
gate and data lines on a first substrate, crossing of the gate and data lines defining pixel regions;
a switching device near the crossing of the gate and data lines;
a pixel electrode in one of the pixel regions on the first substrate, the pixel electrode having a slit, a central portion and at least two side edge portions, the two side edge portions being bent and the central portion being flat, wherein the two side edge portions are substantially symmetrical with reference to the slit;
a common electrode on a second substrate; and
a liquid crystal layer between the first and second substrates.

* * * * *